United States Patent [19]

Christy

[11] Patent Number: 4,762,448
[45] Date of Patent: Aug. 9, 1988

[54] THREADING APPARATUS FOR MILLING MACHINES

[76] Inventor: Harold L. Christy, 44 Sleepy Hollow Dr., Prescott, Ariz. 85301

[21] Appl. No.: 2,648

[22] Filed: Jan. 12, 1987

[51] Int. Cl.$^4$ .............................................. B23G 3/00
[52] U.S. Cl. .............................. 409/233; 10/139 CN; 408/137
[58] Field of Search .................. 409/65, 66, 68, 74, 409/76, 77, 78, 233; 10/89 R, 89 WH, 101 R, 102, 105, 129 R, 139 R, 139 CN; 408/137; 51/95 GH, 288

[56] References Cited

U.S. PATENT DOCUMENTS

| | | | |
|---|---|---|---|
| 1,946,214 | 2/1934 | Kabigting | 408/137 X |
| 2,290,395 | 7/1942 | Van Ness et al. | 409/78 X |
| 3,526,167 | 9/1970 | Escobedo | 409/74 |
| 3,545,018 | 12/1970 | Peterson | 409/66 X |
| 3,661,470 | 5/1972 | O'Pry | 408/137 |
| 4,480,700 | 11/1984 | Krieger et al. | 408/137 X |

Primary Examiner—Z. R. Bilinsky
Attorney, Agent, or Firm—H. Gordon Shields

[57] ABSTRACT

Threading apparatus for a vertical milling machine includes a threaded sleeve at the upper portion of a milling machine draw bar and a split nut thread guide secured to the top of the milling machine and about the upper portion of the draw bar. When the split nut engages the threads on the draw bar, rotation of the draw bar causes the draw bar to move vertically in response to the mating threads of the sleeve and the split nut so that a thread cutting tool on the opposite end of the draw bar will cut threads in a work piece. By changing sleeves and split nuts, virtually any pitch thread may be cut.

16 Claims, 2 Drawing Sheets

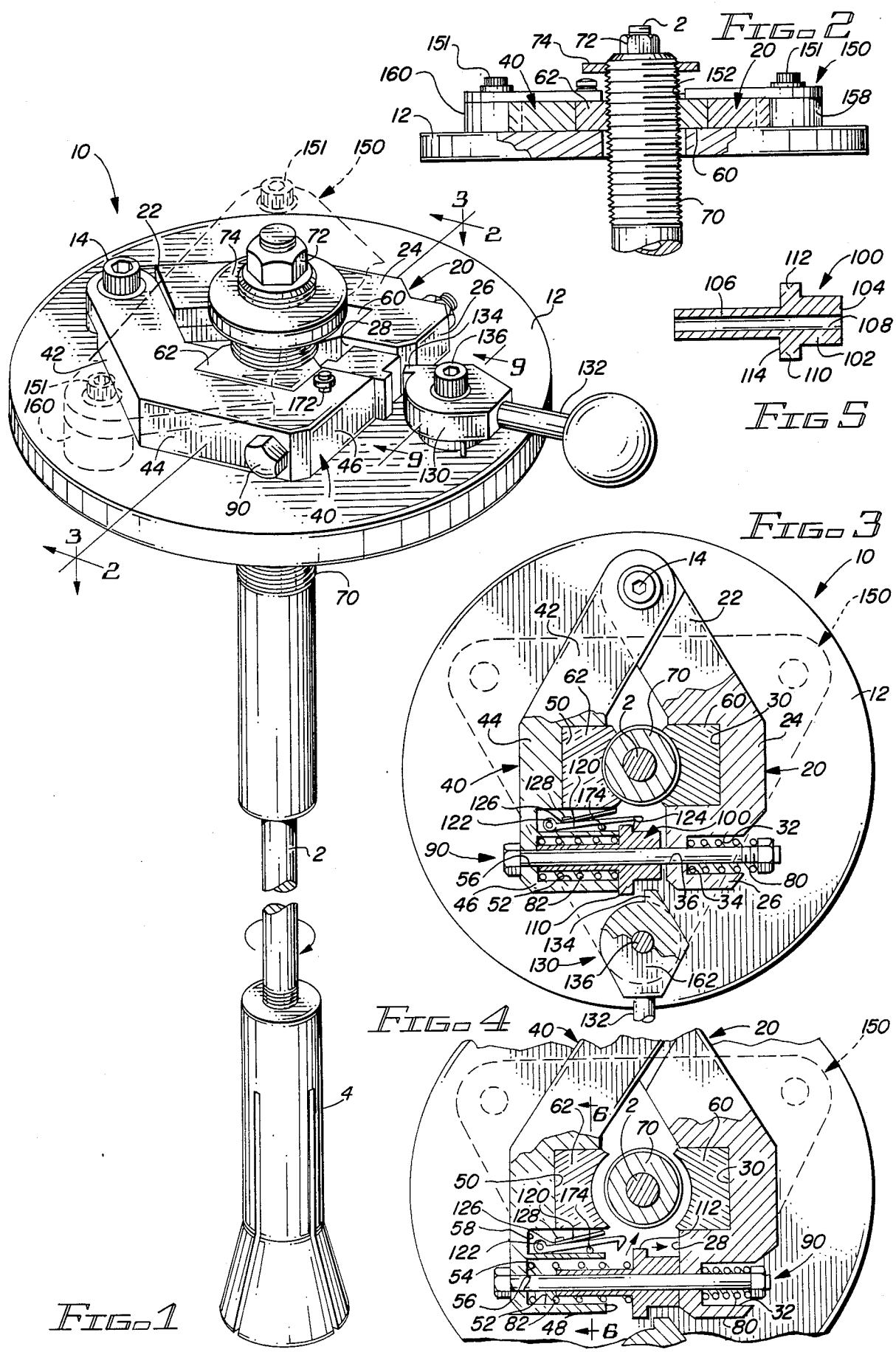

THREADING APPARATUS FOR MILLING MACHINES

BACKGROUND OF THE INVENTION

1. Field of the Invention

This invention relates to thread cutting apparatus, and, more particularly, to thread cutting apparatus for vertical milling machines.

2. Description of the Prior Art

U.S. Pat. No. 1,946,214 (Kabigting) discloses a drill with a frame for the drill which allows the drill to be used as a drill press. A spindle is secured to the frame and is used in place of the original drill spindle. The spindle includes different pitch thread portions, and two different split nuts are used with the respective portions of different pitch. The split nuts are actuated into and out of engagement with the spindle by means of cams and springs. The speed at which the drill penetrates the work depends on which nut and which threaded portion are in engagement.

U.S. Pat. No. 2,001,057 (Fellay) discloses a drill system utilizing a lead screw and split nut elements. The engaging and disengaging of the split nut elements with the lead screw is manually accomplished. Rotation of the box housing, with the split nuts engaged, causes rotation of the screw. With the half nuts disengaged, rotation of the housing has no effect on the lead screw.

U.S. Pat. No. 3,365,735 (Brown) discloses a thread tapping apparatus which uses a screw and a nut system to advance the tap. The screw threads are secured for vertical movement to a sleeve disposed on a splined shaft. The shaft is in turn secured to a motor. Vertical movement of the tap occurs only when the threads are coupled to the split nuts. Otherwise, rotary motion only, without any vertical motion, takes place.

U.S. Pat. No. 3,661,470 (O'Pry) discloses a power takeoff system utilizing a lead screw connected to a drive system. Split nut segments are hydraulically coupled to and from the lead screw to control the advancement of a tool relative to the drive system. A threaded shaft is secured to the power takeoff system, and split nuts engage the threaded shaft to cause rotation of the tool for cutting threads. When the split nut elements are disengaged from the threaded shaft, no longitudinal movement of the tool takes place.

U.S. Pat. No. 4,480,700 (Krieger et al) discloses a boring device utilizing a split nut assembly to engage a lead screw for forcing engagement between the boring tool and the work. The engagement of the split nut elements with the lead screw is controlled so as to control the movement of the tool. Release of the split nuts from the lead screw disengages the tool when the desired depth of cut has been made.

All of the above-discussed patents utilize, in some fashion, the concept of a threaded lead screw, sleeve, etc., engageable by split nuts to cause movement of the lead screw. Upon release of the threaded nuts with the threaded shaft or sleeve, movement, along the axis of the shaft, etc., ceases. In some cases rotary motion continues, but axial movement, either vertical or horizontal, stops with the disengagement of the split nut elements from the lead screw or threaded element.

Drilling or thread cutting or the like is accomplished with the engagement of the split nuts with the threaded shaft or sleeve. Some degree of controlled axial movement is accomplished by a tool with respect to work. However, the engagement or disengagement of the split nuts with the threaded element is generally manually accomplished. Moreover, it will be noted that some of the apparatus disclosed in the patents is relatively complicated, and thus relatively expensive.

The apparatus of the present invention is relatively simple, and the disengagement of split nut elements from a threaded sleeve may be accomplished automatically with a relatively simple cam release system. Engagement between the split nut elements and the threaded sleeve is manually accomplished. The apparatus allows internal or external threads of any desired pitch and any desired thread style to be accomplished in a relatively simple and inexpensive manner.

SUMMARY OF THE INVENTION

The invention described and claimed herein comprises a threaded sleeve disposed on a draw bar for determining the pitch of threads to be cut by a tool secured to the bottom of the draw bar, and a split nut assembly which is manually actuable with the threaded sleeve. The split nut elements may be disengaged automatically upon reaching a predetermined depth of cut or when a predetermined axial movement has been accomplished through a cam system for releasing the split nuts.

Among the objects of the present invention are the following:

To provide new and useful thread cutting apparatus;

To provide new and useful thread cutting apparatus for a vertical milling machine;

To provide new and useful apparatus for controlling the vertical movement of a draw bar in a milling machine;

To provide new and useful apparatus for varying the helical path of a cutter element on a milling machine; and To provide new and useful aparatus for terminating the vertical movement of a draw bar in a milling machine.

BRIEF DESCRIPTION OF THE DRAWING

FIG. 1 is a perspective view of the apparatus of the present invention.

FIG. 2 is a view in partial section of the apparatus of FIG. 1 taken generally along line 2—2 of FIG. 1.

FIG. 3 is a view in partial section of the apparatus of FIG. 1, taken generally along line 3—3 of FIG. 1.

FIG. 4 is a view in partial section of the apparatus of FIG. 3, illustrating the sequential operation of the apparatus of the present invention.

FIG. 5 is a side view in partial section of a portion of the apparatus of the present invention.

DESCRIPTION OF THE PREFERRED EMBODIMENT

Figure 7:
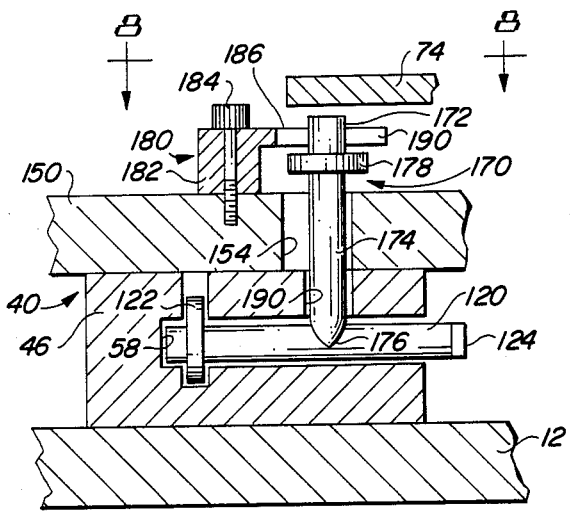
FIG. 7 is a view in partial section taken generally along line 7—7 of FIG. 6.

FIG. 1 is a perspective view of threading apparatus 10 of the present invention, which is designed primarily for use in vertical milling machines. A draw bar 2 of a milling machine is shown extending downwardly from the apparatus 10. At the lower end of the draw bar 2 is a collet 4. The collet 4 may hold a cutting tool for cutting threads. Preferably, of course, the apparatus 10 of the present invention will be used for cutting internal threads, although it may also be used for external threads. However, a single point cutting tool, not shown, may typically be secured to the collet 4.

As is well known and understood in the art, the purpose of a draw bar is to draw a collet securely into a spindle so that the tool, the collet, the draw bar, and the spindle all rotate together. This is, of course, well known and understood in the milling machine art. However, for purposes of clarity, details of the milling machine, including the spindle, have been omitted since they do not pertain directly to the present invention. Moreover, it is well known and understood that a collet, such as the collet 4, includes a key way (not shown) to key the collet to the spindle. Again, for purposes of clarity, such details have been omitted from the drawing.

The apparatus 10 of the present invention includes a base plate 12 which is appropriately secured to the top of a milling machine head (not shown). In operation, the top of the heads of milling machines typically include three tapped holes which are used when it is desired to pull the bearings from the top of the drilling head. These tapped holes are used by the apparatus of the present invention to seoure the base plate 12 to the top of the milling machine head.

Extending into the base plate 12 is a pivot pin 14. The pivot pin 14 is the pivot pin on which a pair of arms, including an arm 20 and an arm 40, pivot transversely or horizontally, generally parallel to the base plate 12.

The arm 20 consists of three portions, a pivot portion 22, a nut portion 24, and a lock portion 26. On the lock portion 26, there is a front face or wall 28. The front face or wall 28 extends toward a similar or corresponding portion of the arm 40.

A recess 30, generally rectangular in configuration, extends into the nut portion 24 of the arm 20. The recess 30 receives a half-nut 60.

In the lock portion 26 of the arm 20 there is a bore 32. The bore 32 includes an end wall 34. The end wall 34 is generally parallel to the end wall or face 28. A relatively small diameter bore 36 extends between the end wall 34 and the end wall or face 28. The bores 32 and 36 are generally coaxially aligned.

The arm 40 is substantially identical in general configuration to the arm 20. It includes a pivot portion 42, a nut portion 44, and a lock portion 46. The lock portion 46 includes an end face 48 which extends toward the end face 28 of the lock portin 26 of the arm 20.

The nut portion 44 includes a generally rectangularly configured recess 50. The recess 50 receives a half nut 62. The half nuts 60 and 62 are held in their recesses 30 and 50 between the base plate 12 and a top plate 150. The plate 150 serves to hold the half nuts 60 and 82 in place on the base plate 12 and within their respective recesses 30 and 50. The top plate 150 prevents the vertical movement of the half nuts 60 and 62. With the top plate 150 removed, the half nuts may be changed in accordance with the desired pitch and thread configuration desired to be made by the apparatus of the present invention.

FIG. 2 is a side view in partial section of the apparatus of the present invention taken generally along line 2—2 of FIG. 1. FIG. 3 is a top view of the apparatus of the present invention in partial section, taken generally along line 3—3 of FIG. 1, with the top plate 150 shown only in dotted line. FIGS. 2 and 3 illustrate the half nuts 60 and 62 secured to a lead screw 70. The lead screw 70 is in turn secured to the draw bar 2. FIG. 4 is a top view similar to FIG. 3, but showing the half nuts 60 and 62 released from the lead screw 70.

Figure 6:
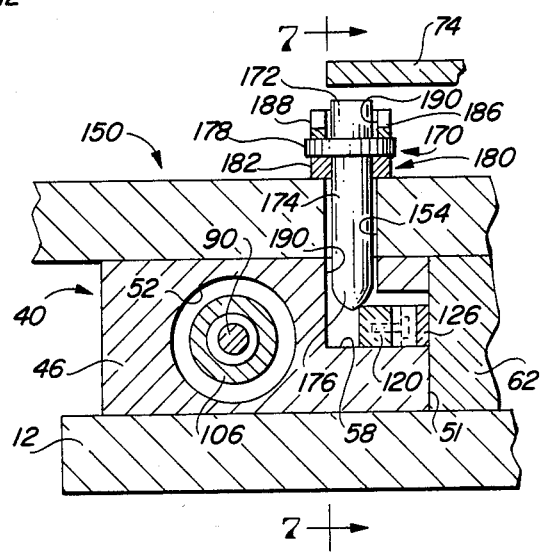
FIG. 6 is a view in partial section along line 6—6 of FIG. 4.
Figure 8:
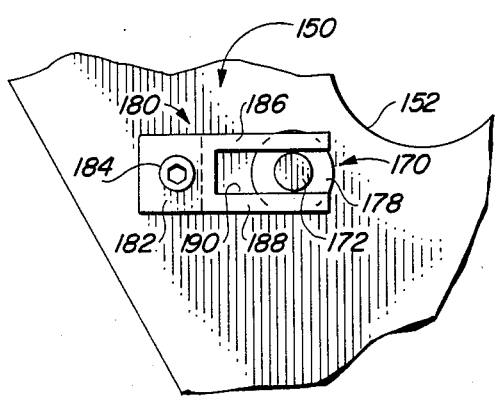
FIG. 8 is a top view of a portion of the apparatus of the present invention taken generally along line 8—8 of FIG. 7.

Details of the opening and closing, or the locking and releasing, of the arms 20 and 40, and of the half nuts 60 and 62 with respect to the lead screw 70, are shown in FIGS. 2, 3, and 4, and also in FIGS. 6, 7, and 8. FIG. 6 is a view in partial section through the lock portion 46 of the arm 40, taken generally along line 6—6 of FIG. 4. FIG. 7 is a view in partial section taken generally along line 8—8 of FIG. 7.

For the following discussion, reference will generally be made to FIGS. 1-4 and 6-8. Specific references to a Figure will be made as required for clarity.

The lock portion 46 of the arm 50 includes a bore 52 extending inwardly from the end face 48. The bore 52 includes an end wall 54. A bore 56 extends through the end wall 54 and extends through the lock portion 46. The bore 36 and the bore 56 are coaxially aligned with each other. They are also generally coaxially aligned with the bores 32 and 52. A bolt or tie rod 90 extends through the bores 36 and 56, and through the bores 32 and 52. The bolt or tie rod 90 is used to secure the arms 20 and 40 together, as will be discussed in detail below.

A compression spring 80, which may be referred to as a closure or engage spring, is disposed about the bolt or tie rod 90 within the bore 32. A compression spring 82, which is an open or disengage spring, is disposed in the bore 52 and about the tie rod or bolt 90. The compression spring 82 is substantially stronger than the compression spring 80. The reason for this, and the general functions of the springs 80 and 82 will be discussed in detail below.

Also disposed within the bore 52, within the coils of the compression spring 82, and about a portion of the bolt 90, is a sleeve 100. The sleeve 100 is also shown in partial section in FIG. 5. FIG. 5 comprises a side view in partial section of the sleeve 100.

The sleeve 100 includes two cylindrical portions, an outer cylindrical portion 102 and an inner cylindrical portion 106. The outer cylindrical portion 102 includes an end face 104. In FIG. 4, the end face 104 of the sleeve 100 is shown disposed against the end face or outer wall 28 of the arm 20.

Extending through the sleeve 100 is a bore 108. The bolt or tie rod extends through the bore 108 of the sleeve 100.

The inner cylindrical portion 102 of the sleeve 100 is disposed within the bore 52, while the outer cylindrical portion 106 is disposed in the space between the end faces 28 and 48 of the lock portions 26 and 46 of the arms 20 and 40, respectively.

Extending outwardly from the cylindrical portions 102 and 106 are a pair of arms, including an engage arm 110 and a lock arm 112. The engage arm 110 cooperates with an engage head 130, which is appropriately secured to the base plate 12 and pivots thereon. The lock arm 112 cooperates with a close latch 120 to lock the arms 20 and 40, and the half nuts 60 and 62, about the lead screw 70 on the draw bar 2.

The close latch 120 is disposed in a slot 58 which extends inwardly from a wall 51 of the recess 50 and into the lock portion 46 of the arm 40. The close latch 120 is pinned in the slot 58 by a pivot pin 122. The close latch 120 is appropriately spring biased by a leaf spring 126 to the latch position, in which the close latch 120 is secured to the engage arm 110 of the sleeve 100. The leaf spring 126 is secured to the latch 120 by a screw 128, best shown in FIG. 4.

In FIG. 3, the sleeve 110 is shown locked, with the nuts 60 and 62 engaging the outer threads of the lead screw 70. In FIG. 4, the sleeve 100 is shown unlocked from the latch 120, thus disengaging the half nuts 60 and 62 from the lead screw 70. The lock spring 126 is appropriately secured to the latch 120 and extends to, or bears against, the half nut 62.

The sleeve 100 includes a rear face 114 on the rear portion of the arms 110 and 112, or at the juncture of the inner cylindrical portion 106 and the arms 110 and 112. When the sleeve 100 is in the closed or latched position, as shown in FIG. 3, the rear face 114 of the sleeve is disposed against the end face 48 of the arm 40. With the sleeve 100 disposed against the arm 40, the compression spring 82 is compressed within the bore 52. At such time, the half nuts 60 and 62 are disposed against the lead screw 70.

The lead screw 70 is disposed about the draw bar 2, and is secured thereon by a nut 72. The lead screw 70 is appropriately externally threaded to match the internal threads of the half nuts 60 and 62. In order to change either the pitch of the threads or the type of threads, or both, the lead screw 70, and the half nuts 60 and 62, must be appropriately changed. They are relatively easily changed by simply disengaging the latch 120 from the arm 112 and by removing the top plate 150. The compression spring 82, stronger than the compression spring 80, biases the sleeve 100 outwardly until a maximum, predetermined distance is defined between the faces 28 and 48 of the arms 20 and 40, respectively, to move the half nuts 60 and 62 away from the lead screw 70. The nut 72 is removed from the top of the draw bar 2, and the lead screw may be withdrawn therefrom. At the same time that the lead screw 70 is being changed, and with the top plate 150 removed, the half nuts 60 and 62 may also be removed from their respective recesses 22 and 50. Obviously, the lead screw 70 and the half nuts 60 and 62 are matched as a unit to provide the necessary thread configuration and pitch desired to be made by a single point thread cutting tool secured to the collet 4.

Figure 9:
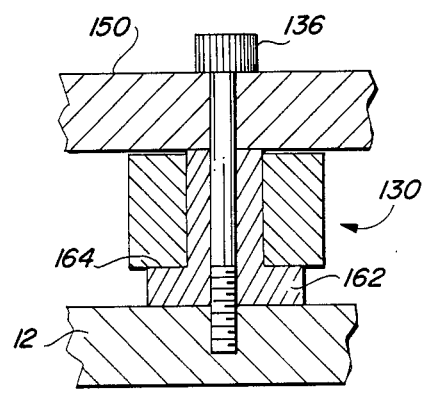
FIG. 9 is a view in partial section taken generally along line 9—9 of FIG. 1.

The engage head 130 includes a lever 132 with a pawl 134 at the outer end. As shown in FIG. 9, the engage head is disposed about a spacer 162 and is appropriately secured on the spacer 162 by the top plate 150 and by a screw 136.

FIG. 9 is a view in partial section taken generally along line 9—9 of FIG. 1. The spacer 162 is shown in FIG. 9 as including a shoulder 164, and the engage head 130 is disposed on the shoulder 164. The spacer includes a bore through which the screw 136 extends to secure the top plate 150, the spacer 162, and the engage head 130 to the base plate 12.

The spacer 162 is of a generally cylindrical configuration above the shoulder 164. The engage head 130 includes a central bore which receives the cylindrical portion of the spacer 162, as shown in FIGS. 1 and 9. The engage head pivots freely on the spacer 162.

The engage head 130 is manually operated by an operator of the milling machine to which the apparatus 10 is secured. The engaging of the apparatus is accomplished by manually pivoting the lever in a counterclockwise direction, as viewed in FIGS. 1 and 3. In such a counterclockwise move, the pawl 134 contacts the engage arm 110 of the sleeve 100 to move the sleeve to the left, or inwardly with respect to the lock portion 46 of the arm 40. The inner cylindrical portion 102 of the sleeve 100 moves into the bore 52, and the compression spring 82 is appropriately compressed between the end wall 54 of the bore 52 and the face 114 of the sleeve 100.

The outer end of the close latch 120 is contacted by the rear face 114, and is cammed outwardly to allow the lock arm 112 to move past the head 124. At such time as the lock arm 112 is past the latch head 124, the bias of the spring 126 on the latch 120 causes the latch head 124 to move toward the sleeve 100. The lock arm 112 is then secured by the latch head 124 of the latch 120. This is shown in FIG. 3.

The movement of the engage head 130 also causes the arms 20 and 40 to move toward each other under the bias of the compression spring 80. The arms 20 and 40 pivot on the pivot pin 14. As the arms 20 and 40 move towards each other, there is contact between the threaded inner periphery of the half nuts 60 and 62 and the threaded external periphery of the lead screw 70. It will be noted that there may be a slight vertical adjustment of the lead screw 70 relative to the half nuts 60 and 62 so that the threads, the internal threads on the half nuts 60 and 62 and the external threads on the lead screw 70, may appropriately mesh or mate.

FIGS. 4, 6, and 7 are views which illustrate the release system for releasing the arms 20 and 40 and thereby releasing the half nuts 60 and 62 from an engagement with the lead screw 70. For the following discussion, reference will be made primarily to FIGS. 4, 6, and 7, and also to FIGS. 1, 2, 3, 4, and 5.

Turning momentarily to FIG. 2, the top plate 150 is shown disposed on top of the arms 20 and 40, and on top of the half nuts 60 and 62. The top plate 50 is shown in phantom in FIGS. 1, 3, and 4. The top plate 150, as illustrated in FIGS. 1, 3, and 4, is generally of a triangular configuration. Its primary purpose is to hold the arms 30 and 40 and the half nuts 60 and 62 downwardly onto the base plate 12. The top plate 150 includes a central aperture 152 (see FIG. 2) through which the lead screw 70 and the upper portion of the draw bar 2, extend.

The top plate 150 is held onto the base plate 12 by three fastener elements, such as cap screws 151 and 136. The top plate 150 is supported above the plate 12 on three spacers, including spacers 156 and 158, best shown in FIG. 2, and the third spacer 162, shown in FIG. 3, and in FIG. 9. The spacers are disposed on top of the plate 12.

The spacers 156 and 158 are simply cylindrical elements with a central axial bore through which the fastener elements (cap screws) 151 extend. The spacer 162 serves also as a pivot pin for the engage head 130, and its shape is accordingly of a stepped cylindrical configuration with a central bore. The engage head 130 is disposed on the step 164 of the spacer, as shown in FIG. 9.

The spacer 162, as well as the engage head 130, are both secured to the top plate 12 by a cap screw 136, which is substantially identical to the cap screws 151.

In FIGS. 6 and 7, the top plate 150 is shown disposed on top of the arm 40, and particularly on top of the lock portion 46 of the arm 40. The top plate includes a slot 154 extending through the top plate and disposed over an aligned bore or aperture 190 in the lock portion 46 of the arm 40.

A release pin 170, which includes a head 172, a shank portion 174, and a lower tapered point portion 176, is shown disposed in the bore 190. The shank portion 174 of the release pin 170 is also shown in FIGS. 3 and 4. The pin 170 also includes a circular collar extending radially outwardly between the head 172 and the shank 174.

As shown in FIGS. 6 and 7, the head 172 of the release pin 170 is shown disposed beneath the outer portion of the stop element 74. The stop element 74, itself, is best shown in FIGS. 1 and 2. The shank 174 of the release pin 170 extends through the slot 154 and into the bore 190. The bore 190 extends to the slot 58. The shank 174 is disposed in the bore 190. The tapered point portion 176 extends into the slot 58 and is disposed against the close latch 120. The close latch 120 is biased against the tapered point 176 by the leaf spring 126. The leaf spring extends between the latch 120 and the half nut 62 and provides the biasing action which cams the pin 170 upwardly in the bore 190 and in the slot 154. The camming action occurs as the latch 120 presses against the curved or tapered lower portion 176 of the pin 170.

The release or trip pin 170 is held in place by a bifurcated yoke element 180. The yoke element 180 is secured to the top of the top plate 150. The yoke element 180 includes a block 182. A capscrew 184 extends through the block 182 and into the top plate 150 to secure the yoke 180 to the plate 150.

Extending outwardly from the block 182 is a slotted arm. The slotted arm includes two arm elements 185 and 188. The slot 190 receives the head 172 of the pin 170. The slot 190 is sufficiently wide to allow the pin 170 to move freely.

The arm elements 186 and 188 are disposed above the top surface of the plate 150. The radially extending collar 178 of the pin 170 is disposed beneath the arms 186 and 188. There is sufficient vertical clearance between the arms 186 and 188 to allow the pin 170 to move vertically downwardly when the stop element 74 presses upon the head 172 to cam the latch 120 against the bias of the leaf spring 126 to release the arm 112 of the sleeve 100. The arms 186 and 188 guide or retain the pin 170.

The length of the slot 154 in the plate 150 and the length of the slot 190 in the yoke element 180 are sufficient to allow for the horizontal or lateral travel of the pin 170 as it moves with the arm 40. The arm 40 pivots in response to both the closing and the opening of the arms 20 and 40 about the lead screw 70. Since the top plate 150 is fixed, the slots 154 and 190 must accommodate the lateral or pivoting movement of the pin 170 with the arm 40.

In operation, the open or unlatch element or stop element 74, which is internally threaded, of course, is rotated downwardly on the threaded portion of the lead screw 70 until the distance between the top of the head 172 of the release pin 170 and the bottom of the element 74 is the predetermined distance or height that is desired for the internal threading operation of a cutting element (not shown) secured to the collet 4. Then, at such time as the element 74 contacts the release pin 170, and biases the pin downwardly, the tapered portion 176 of the shank 174 will cause the close or locking latch 120 to move away from the lock or engage arm 112 of the sleeve 100.

When the latch 170 is released from the lock arm 112, the compression spring 82 is released, and the compression spring 82 overcomes the bias of the compression spring 80 and causes the sleeve 100 to be moved to the right, as in FIG. 4, or outwardly from the arm 40, in which the face 104 of the sleeve 100 contacts the face or wall 28 of the arm 20. The arms 20 and 40 are both moved apart, as they pivot on their pivot pin 14, to disengage the half nuts 60 and 62 from the lead screw 70. At such time as the lead screw 70 is disengaged, the downward movement of the lead screw 70 and the draw bar 2 ceases.

The engaging operation for engaging the half nuts 60 and 62 with the lead screw is accomplished with the engage head 130. Incidentally, it will be understood that as long as the stop element 74 biases the pin 170 downwardly, the latch 120 will remain as shown in FIG. 4. However, as soon as the stop element is removed, the bias of the spring 126 will cause the latch 120 to move toward the end wall of the slot 58, and the pin 170 will accordingly be biased upwardly, as discussed above. The stop element 74 must accordingly be withdrawn from the pin 170 before the engage head is actuated to close the arms, and the half nuts 60 and 62 against the lead screw 70.

Assuming the state of the apparatus of the present invention to be as illustrated in FIG. 4, with the arms 20 and 40 in their "open" position, the engage head 130 is moved or pivoted counterclockwise, as discussed above, to cause the pawl 134 to contact and move the engage arm 110 of the sleeve 100 to "close" the arms 20 and 40. Continued movement of the engage head 130 pushes the sleeve 100 leftwardly, as viewed in FIGS. 3 and 4, until the rear face 114 of the sleeve 100 contacts the end face 48 of the arm 40. As discussed above, the leftward movement of the sleeve 100 causes the lock arm 112 to engage the latch head 124 of the close latch 120. The outer face of the latch head 124 is sloping and it accordingly acts as a cam surface to cam the latch 120 against the bias of the spring 126 until the arm 112 is past the latch head 124. The spring 126 then biases the latch to cause the latch head 124 to latch onto the arm 112.

Movement of the sleeve 100 against the bias of the spring 82 by means of the engage head 130 allows the compression spring 180 to move the arms 20 and 40 inwardly to cause the half nuts 60 and 62 of the arms 20 and 40, respectively, to engage the outer threaded periphery of the lead screw 70. This is the state illustrated in FIGS. 1, 2, and 3.

With the half nuts 60 and 62 contacting the lead screw 70, when the vertical milling machine is engaged, causing rotation of the draw bar 2, as is well known and understood in the art, the draw bar 2 will move vertially downwardly. The draw bar cannot rotate freely with the lead screw 70 secured to it and the half nuts 60 and 62 threadedly engaging the lead screw. The draw bar 2 must move in accordance with the threads on the lead screw 70 and and on the half nuts 60 and 62. Accordingly, the draw bar 2, with its collet 4, and a thread cutting tool (not shown) secured to the collet 4, will describe a helical path which follows the pitch of the mating threads on the lead screw 70 and the half nuts 60 and 62.

When the desired depths or lengths of the thread cutting has been achieved or accomplished, and in response to the original positioning of the stop or open element 74 on the lead screw 70, as discussed above, the release pin 70 will be moved downwardly to release the close latch 120 from engagement with the lock arm 112 of the sleeve 100. The sleeve then moves under the bias of the compression spring 82, as illustrated in FIG. 4, and the draw bar 2 then rotates freely since the externally threaded lead screw 70 is no longer engaged by the half nuts 60 and 62.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Threading apparatus for single point threading by vertical milling machines having a head and a rotatable drawbar extending through the head, comprising, in combination:
   a base plate securable to the head;
   first arm means pivotally secured to the base plate;
   second arm means pivotally secured to the base plate;
   lead screw means securable to the drawbar and rotatable therewith and having threads corresponding to the desired threads to be cut;
   threaded nut means secured to the first and second arm means and pivotal therewith to engage the threads of the lead screw means to cause the lead screw means and the drawbar to move vertically in accordance with the pitch of the threads on the lead screw means and the threaded nut means as the drawbar rotates, and to disengage the lead screw means to cause the drawbar to cease vertical movement; and
   means for pivoting the first and second arm means to engage and to disengage the threaded nut means and the lead screw means.

2. The apparatus of claim 1 in which the first and second arm means each include a recess for receiving the threaded nut means.

3. The apparatus of claim 2 in which the nut means includes a half nut in the recess of the first arm means and a half nut in the recess of the second arm means.

4. The apparatus of claim 3 in which the means for pivoting the first and second arm means includes:
   a first bore in the first arm means,
   a second bore in the second arm means,
   first spring means in the first bore,
   second spring means in the second bore, and
   tie rod means extending through the first bore and extending through and biased by the first spring means and extending through the second bore and the second spring means for typing together the first and second arm means to pivot the first and second arm means to engage the nut means and the lead screw means in response to the bias of the first spring means.

5. The apparatus of claim 4 in which the first spring means comprises a compression spring having a first force, and the second spring means comprises a compression spring having a second force which is greater than the first force.

6. The apparatus of claim 4 in which the means for pivoting the first and second arm means further includes:
   a sleeve disposed in the second bore and biased outwardly therefrom by the second spring means to pivot the first and second arm means to disengage the nut means and the lead screw means,
   a first arm extending outwardly from the sleeve, and
   a close latch pivotally secured to the second arm means for engaging the first arm to latch the sleeve within the second bore against the bias of the second spring means to allow the pivoting of the first and second arm means in response to the bias of the first spring means.

7. The apparatus of claim 6 in which the means for pivoting the first and second arm means further includes:
   a second arm extending outwardly from the sleeve remote from the first arm, and
   engage head means for engaging the second arm to move the sleeve against the bias of the second spring means for engaging the close latch and the first arm.

8. The apparatus of claim 6 in which the means for pivoting the first and second arm means further includes third spring means for biasing the close latch into engagement with the first arm of the sleeve.

9. The apparatus of claim 6 in which the means for pivoting the first and second arm means further includes trip pin means for pivoting the close latch to disengage the first arm of the sleeve to allow the pivoting of the first and second arm means in response to the bias of the second spring means to disengage the nut means and the lead screw means.

10. The apparatus of claim 9 in which the lead screw means includes an adjustable stop element for engaging the trip pin means after a predetermined vertical movement of the lead screw means and the drawbar.

11. The apparatus of claim 6 in which the second arm means further includes a slot adjacent to the second bore, and the close latch is disposed in the slot.

12. The apparatus of claim 6 in which the apparatus further includes a top plate secured to the base plate and disposed above the first and second arm means for preventing vertical movement of the first and second arm means.

13. The apparatus of claim 12 in which the means for pivoting the first and second arm means further includes a trip pin extending through the top plate and into the second arm means for pivoting the close latch to disengage the close latch from the first arm to allow the pivoting of the first and second arm means in response to the bias of the second spring means to disengage the nut means and the lead screw means.

14. The apparatus of claim 13 in which the means for pivoting the first and second arm means further includes means for retaining the trip pin.

15. The apparatus of claim 14 in which the means for retaining the trip pin includes a pair of arms secured to the top plate, and the trip pin is disposed between the pair of arms.

16. The apparatus of claim 15 in which the means for retaining the trip pin further includes a collar secured to the trip pin and disposed between the top plate and the pair of arms.

* * * * *